(12) United States Patent
Carlson et al.

(10) Patent No.: US 11,405,692 B2
(45) Date of Patent: *Aug. 2, 2022

(54) SYSTEMS, METHODS AND APPARATUS FOR PRESENTING RELEVANT PROGRAMMING INFORMATION

(71) Applicant: DISH Technologies L.L.C., Englewood, CO (US)

(72) Inventors: Jay P. Carlson, Denver, CO (US); Danny J. Minnick, Littleton, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,406

(22) Filed: May 14, 2020

(65) Prior Publication Data

US 2020/0275157 A1    Aug. 27, 2020

Related U.S. Application Data

(63) Continuation of application No. 14/839,492, filed on Aug. 28, 2015, now Pat. No. 10,674,214.

(51) Int. Cl.
*H04N 21/262*    (2011.01)
*H04N 21/466*    (2011.01)
(Continued)

(52) U.S. Cl.
CPC ... *H04N 21/4662* (2013.01); *G06F 16/24578* (2019.01); *G06F 16/489* (2019.01); *H04N 21/251* (2013.01); *H04N 21/25891* (2013.01); *H04N 21/44204* (2013.01); *H04N 21/44222* (2013.01); *H04N 21/4532* (2013.01); *H04N 21/466* (2013.01); *H04N 21/4821* (2013.01);
(Continued)

(58) Field of Classification Search
None
See application file for complete search history.

(56) References Cited

U.S. PATENT DOCUMENTS 9,503,791 B2    11/2016    Pangilinan et al.
10,674,214 B2 *   6/2020    Carlson ............... G06F 16/489
(Continued)

OTHER PUBLICATIONS

International Search Report and Written Opinion for International Application No. PCT/US2016/048997, dated Oct. 18, 2016, 13 pages.

*Primary Examiner* — Nasser M Goodarzi
*Assistant Examiner* — Terrika Peterson
(74) *Attorney, Agent, or Firm* — Perkins Cole LLP

(57) ABSTRACT

Various embodiments of systems, apparatus, and/or methods are described for presenting relevant programming information. A viewing action of an audiovisual event is detected on a receiving device. Data associated with the viewed audiovisual event is then retrieved. The retrieved data includes at least receiving device information and audiovisual event information. The retrieved data is then stored in a historical viewing database, and at least one scoring table is generated from the data in the historical viewing database. Programming information for a plurality of candidate audiovisual events that are available to be viewed is then organized based at least in part on the at least one scoring table and a selected time, and the organized programming information is output to a presentation device.

20 Claims, 15 Drawing Sheets

700-b

"MONDAY" SERIES SCORING TABLE

| SERIES ID 702 | TIME SLOT A 704 | TIME SLOT B 706 | TIME SLOT C 708 | TIME SLOT D 710 |
|---|---|---|---|---|
| "The Situation Room" | 0 | 0 | 0.9 | 0 |
| "College Football" | 0 | 0 | 0.1 | 0.1 |
| "The Big Bang Theory" | 0 | 0 | 0 | 0.9 |

(51) Int. Cl.

| | | |
|---|---|---|
| *H04N 21/25* | (2011.01) | |
| *H04N 21/84* | (2011.01) | |
| *H04N 21/45* | (2011.01) | |
| *H04N 21/258* | (2011.01) | |
| *H04N 21/482* | (2011.01) | |
| *H04N 21/442* | (2011.01) | |
| *G06F 16/48* | (2019.01) | |
| *G06F 16/2457* | (2019.01) | |
| *H04N 21/658* | (2011.01) | |

(52) U.S. Cl.
CPC ..... *H04N 21/4826* (2013.01); *H04N 21/6582* (2013.01); *H04N 21/84* (2013.01)

(56) References Cited

U.S. PATENT DOCUMENTS

| | | |
|---|---|---|
| 2001/0049620 A1 | 12/2001 | Blasko |
| 2002/0075320 A1 | 6/2002 | Kurapati |
| 2002/0152459 A1 | 10/2002 | Bates et al. |
| 2003/0067554 A1* | 4/2003 | Klarfeld ........... H04N 21/26283 348/461 |
| 2003/0093792 A1* | 5/2003 | Labeeb ................ H04N 21/454 725/46 |
| 2003/0135853 A1 | 7/2003 | Goldman et al. |
| 2004/0143845 A1 | 7/2004 | Lin et al. |
| 2005/0028104 A1* | 2/2005 | Apparao ............... G06F 16/437 715/738 |
| 2005/0188399 A1 | 8/2005 | Tischer |
| 2005/0235330 A1 | 10/2005 | Odonnell et al. |
| 2005/0240982 A1 | 10/2005 | Blackketter et al. |
| 2006/0010464 A1 | 1/2006 | Azami |
| 2006/0120368 A1 | 6/2006 | Aboukarr et al. |
| 2006/0224624 A1 | 10/2006 | Korn et al. |
| 2006/0263041 A1 | 11/2006 | Gustta |
| 2007/0089129 A1 | 4/2007 | Verhaegh et al. |
| 2007/0100688 A1 | 5/2007 | Book |
| 2007/0233736 A1 | 10/2007 | Xiong et al. |
| 2007/0288964 A1 | 12/2007 | Horiguchi |
| 2008/0301149 A1 | 12/2008 | Malcolm |
| 2009/0077589 A1 | 3/2009 | Boyer et al. |
| 2009/0106797 A1 | 4/2009 | Lucente |
| 2009/0148133 A1 | 6/2009 | Nomura et al. |
| 2009/0193485 A1 | 7/2009 | Rieger et al. |
| 2009/0265742 A1 | 10/2009 | Schwartz et al. |
| 2010/0107196 A1* | 4/2010 | Kitayama ......... H04N 5/44543 725/46 |
| 2010/0149303 A1 | 6/2010 | Thorne et al. |
| 2011/0016479 A1 | 1/2011 | Tidwell et al. |
| 2011/0161153 A1 | 6/2011 | Carvis et al. |
| 2011/0166777 A1 | 7/2011 | Chavakula |
| 2011/0197213 A1 | 8/2011 | Shim et al. |
| 2012/0008821 A1 | 1/2012 | Sharon et al. |
| 2014/0149424 A1 | 5/2014 | Kalmes et al. |
| 2014/0189743 A1* | 7/2014 | Kennedy ......... H04N 21/44222 725/46 |
| 2014/0222830 A1 | 8/2014 | Ringer et al. |
| 2014/0337412 A1 | 11/2014 | Chae et al. |
| 2014/0337735 A1 | 11/2014 | Chen |
| 2015/0006664 A1 | 1/2015 | Aramaki |
| 2015/0039602 A1 | 2/2015 | Grunick et al. |
| 2015/0058175 A1 | 2/2015 | Axt et al. |
| 2015/0195621 A1* | 7/2015 | Harron ............... H04N 21/4312 725/46 |
| 2015/0350709 A1 | 12/2015 | Tomita |
| 2015/0358661 A1 | 12/2015 | Navarro et al. |
| 2016/0029057 A1 | 1/2016 | Wickenkamp |
| 2016/0070764 A1 | 3/2016 | Helvik et al. |
| 2016/0142774 A1 | 5/2016 | Sayyadi-Harikandehei |
| 2016/0150280 A1 | 5/2016 | Cui et al. |
| 2016/0212491 A1 | 7/2016 | Pangilinan et al. |
| 2017/0064393 A1 | 3/2017 | Carlson et al. |

\* cited by examiner

500

RECEIVING DEVICE INFORMATION

502

| DEVICE_ID 506 | USER_ID 508 | ACTION_UTC 510 |
|---|---|---|

AUDIOVISUAL EVENT INFORMATION

504

| SOURCE_ID 512 | EVENT_NAME 514 | EVENT_UTC 516 | DURATION 518 |
|---|---|---|---|
| SERIES_ID 520 | EPISODE_ID 522 | OAD 524 | THEMES 526 |
| ACTORS 528 | PEOPLE 530 | TEAMS 532 | KEYWORDS 534 |

"DAILY" SERIES SCORING TABLE

| SERIES ID 702 | TIME SLOT A 704 | TIME SLOT B 706 | TIME SLOT C 708 | TIME SLOT D 710 |
|---|---|---|---|---|
| "The Situation Room" | 0 | 0 | 0.4 | 0 |
| "Adventure Time" | 0 | 0 | 0.2 | 0 |
| "College Football" | 0 | 0 | 0.3 | 0.3 |
| "Saturday Night Live" | 0.1 | 0 | 0 | 0 |
| "The Big Bang Theory" | 0 | 0 | 0 | 0.8 |

FIG. 7A 700-b

"MONDAY" SERIES SCORING TABLE

| SERIES ID 702 | TIME SLOT A 704 | TIME SLOT B 706 | TIME SLOT C 708 | TIME SLOT D 710 |
|---|---|---|---|---|
| "The Situation Room" | 0 | 0 | 0.9 | 0 |
| "College Football" | 0 | 0 | 0.1 | 0.1 |
| "The Big Bang Theory" | 0 | 0 | 0 | 0.9 |

*FIG. 7B*

"DAILY" ACTORS SCORING TABLE 800-a

| ACTOR ID 802 | TIME SLOT A 804 | TIME SLOT B 806 | TIME SLOT C 808 | TIME SLOT D 810 |
|---|---|---|---|---|
| "Michael J. Fox" | 0 | 0 | 0 | 0.1 |
| "Peter Falk" | 0 | 0 | 0 | 0.2 |
| "Julia Louis-Dreyfus" | 0 | 0 | 0.7 | 0 |
| "Sarah Jessica Parker" | 0.4 | 0 | 0 | 0.4 |
| "Harry Shearer" | 0 | 0 | 0.6 | 0 |

FIG. 8A

"FRIDAY" ACTORS SCORING TABLE

| ACTOR ID 802 | TIME SLOT A 804 | TIME SLOT B 806 | TIME SLOT C 808 | TIME SLOT D 810 |
|---|---|---|---|---|
| "Michael J. Fox" | 0 | 0 | 0 | 0.5 |
| "Julia Louis-Dreyfus" | 0 | 0 | 0.9 | 0 |
| "Sarah Jessica Parker" | 0.1 | 0 | 0 | 0.1 |
| "Harry Shearer" | 0 | 0 | 0.9 | 0 |

SYSTEMS, METHODS AND APPARATUS FOR PRESENTING RELEVANT PROGRAMMING INFORMATION

CROSS-REFERENCE TO RELATED PATENT APPLICATIONS

This application is a continuation of U.S. patent application Ser. No. 14/839,492 filed Aug. 28, 2015, entitled "SYSTEMS, METHODS AND APPARATUS FOR PRESENTING RELEVANT PROGRAMMING INFORMATION," which is incorporated herein in its entirety by reference for all purposes.

BACKGROUND

Receiving devices, such as set-top boxes for satellite and cable television services, allow a user to view an electronic program guide (EPG). The EPG displays a list of audiovisual events that are available to viewed at the current date and time, and at future dates and times. The EPG is typically organized by television channels and by date and time. A user may be required to scroll through many available audiovisual events to locate an audiovisual event that is relevant to the user.

SUMMARY

The present disclosure relates to systems, methods, and apparatus for presenting relevant programming information. In one implementation, the method includes detecting a viewing action of an audiovisual event on a receiving device; retrieving data associated with the viewed audiovisual event, the retrieved data comprising at least receiving device information and audiovisual event information; storing the retrieved data in a historical viewing database; generating at least one scoring table from the historical viewing database; receiving programming information for a plurality of candidate audiovisual events that are available to be viewed; organizing the programming information based at least in part on the at least one scoring table; and outputting the organized programming information.

In some examples, the programming information is organized based at least in part on a selected time or a selected time range. In some examples, generating the at least one scoring table includes assigning an aging factor to the viewed audiovisual event based on a time since the audiovisual event was viewed; and calculating a score for an aspect of the viewed audiovisual event based at least in part on the aging factor. In some examples, the at least one scoring table is generated based at least in part on the retrieved data in the historical viewing database, and generating the at least one scoring table comprises at least one of: creating a new scoring table, updating an existing scoring table, or replacing an existing scoring table. In some examples, the at least one scoring table is generated by the receiving device.

In some examples, the method further includes transmitting the historical viewing database to a remote server, wherein the remote server generates the at least one scoring table; and receiving the at least one scoring table from the remote server.

In some examples, the method further includes identifying a user based at least in part on the retrieved data.

In some examples, the receiving device information comprises one or more of a receiving device identifier, a user identifier, a begin-viewing time, an end-viewing time, and a percentage-viewed. In some examples, the audiovisual event information comprises one or more of an event identifier, a series identifier, an episode identifier, an event start time, an event duration, theme information, actor information, people information, team information, and keyword information. In some examples, the at least one scoring table comprises one or more of a series scoring table, an actors scoring table, a teams scoring table, and a themes scoring table. In some examples, the at least one scoring table includes a score and a time range corresponding to at least one viewed audiovisual event.

In some examples, detecting the viewing action comprises detecting a viewed amount of the audiovisual event exceeds a viewing threshold. In some examples, detecting the viewing action further comprises detecting a user actively viewed the audiovisual event.

In some examples, the method further includes calculating consolidated scores for the plurality of candidate audiovisual events, the consolidated scores based at least in part on the at least one scoring table and a scaling constant; and organizing the programming information based at least in part on the consolidated scores.

In some examples, outputting the organized programming information includes presenting a list of the plurality of candidate audiovisual events on a presentation device, wherein the list is organized based at least in part on the at least one scoring table. In some examples, the plurality of candidate audiovisual events available to be viewed comprise at least one of broadcast television programs, video-on-demand programs, locally recorded audiovisual events, remotely recorded audiovisual events, or over-the-top audiovisual streams.

In another implementation, the method for presenting relevant programming information includes receiving a command to view an audiovisual event on a receiving device; retrieving data associated with the audiovisual event, the retrieved data comprising at least receiving device information and event information; identifying a user profile based at least in part on the retrieved data; receiving programming information for a plurality of candidate audiovisual events that are available to be viewed; organizing the programming information based at least in part on the user profile; and outputting the organized programming information.

In some examples, the programming information is organized based at least in part on a selected time or a selected time range.

In another implementation, a receiving device presenting relevant programming information includes a user communication module to detect a viewing action of an audiovisual event on the receiving device; a communication module to receive audiovisual event information associated with the viewed audiovisual event and programming information for a plurality of candidate audiovisual events that are available to be viewed; a historical viewing database to store the audiovisual event information; at least one scoring table generated from the historical viewing database; a control logic to organize the programming information based at least in part on the at least one scoring table; and a rendering module to output the organized programming information.

In some examples, the programming information is organized based at least in part on a selected time or a selected time range. In some examples, the at least one scoring table is generated by assigning an aging factor to the viewed audiovisual event based on a time since the audiovisual event was viewed; and calculating a score for an aspect of the viewed audiovisual event based at least in part on the aging factor.

In some examples, the audiovisual event information comprises one or more of an event identifier, a series identifier, an episode identifier, an event start time, an event duration, theme information, actor information, people information, team information, and keyword information. In some examples, the at least one scoring table comprises one or more of a series scoring table, an actors scoring table, a teams scoring table, and a themes scoring table.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

FIG. 5 illustrates an example of viewing information stored in a historical viewing database.

FIG. 7A illustrates an example of a "daily" series scoring table.

FIG. 7B illustrates an example of a "Monday" series scoring table.

FIG. 8A illustrates an example of a "daily" actors scoring table.

FIG. 8B illustrates an example of a "Friday" actors scoring table 800-b.

DETAILED DESCRIPTION OF THE DRAWINGS

Figure 1A:
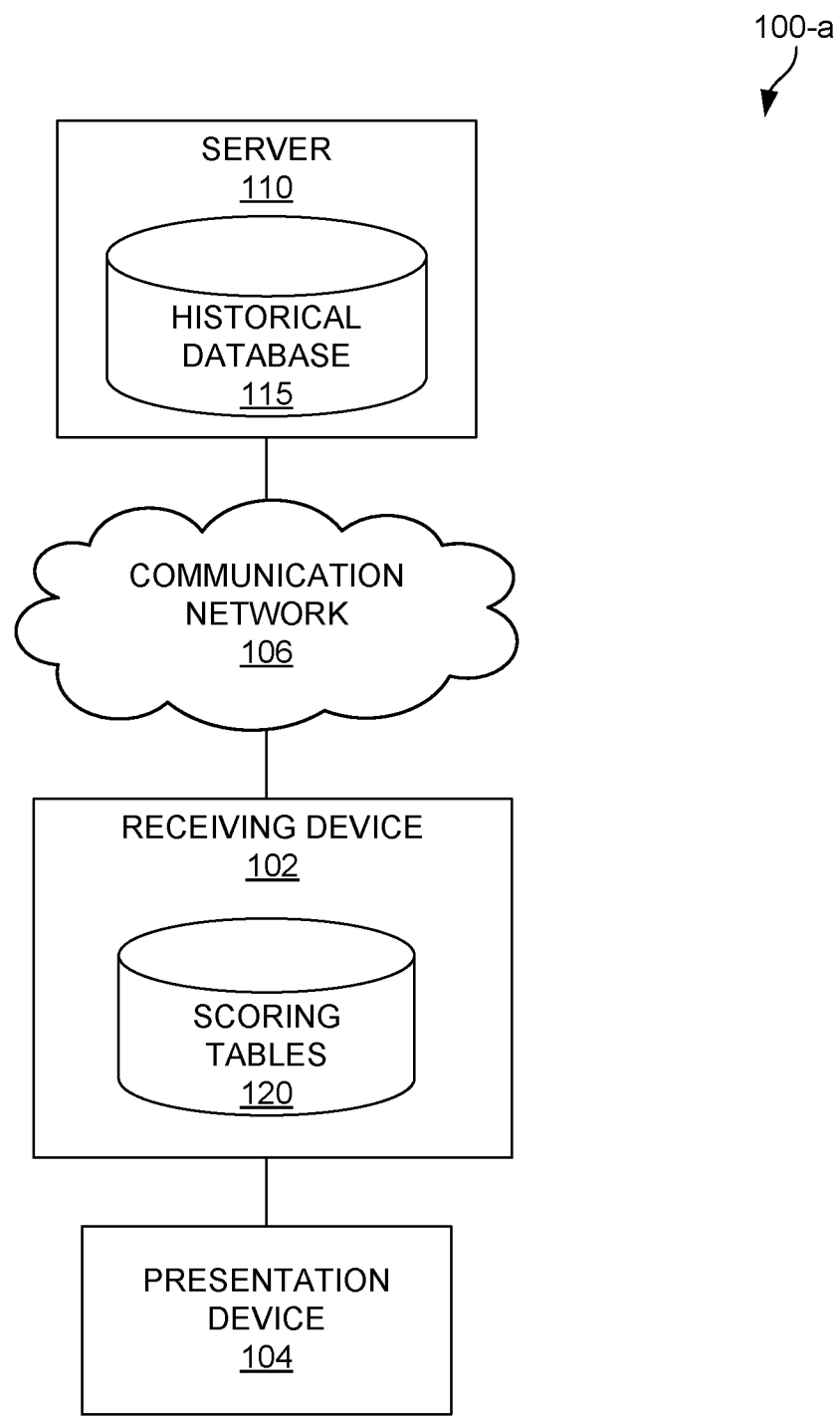
FIG. 1A illustrates an embodiment of a system for organizing programming information for audiovisual events that are available to be viewed.

The technology described herein is related to U.S. patent application Ser. No. 14/597,540, filed on Jan. 15, 2015, which is incorporated by reference herein in its entirety.

The various embodiments described herein generally provide apparatus, systems and methods which facilitate the reception, processing, rendering, and outputting of audiovisual content. More particularly, the various embodiments described herein provide for the organization of programming information. The programming information includes candidate audiovisual events that are available for a user to view.

In at least one embodiment, the audiovisual event to be received, processed, rendered, outputted and/or communicated may come in any form of an audiovisual stream. Exemplary audiovisual stream formats include Motion Picture Experts Group (MPEG) standards, Flash, Windows Media and the like. It is to be appreciated that the audiovisual stream may be supplied by any source, such as an over-the-air broadcast, a satellite, or cable television distribution system, a digital video disk (DVD) or other optical disk, the Internet or other communication networks, and the like. In at least one embodiment, the audiovisual stream may be associated with supplemental data that includes text data, such as closed captioning data or subtitles. Particular portions of the closed captioning data may be associated with specified portions of the audiovisual stream.

Generally, an audiovisual stream is a contiguous block of associated audio and video data that may be transmitted to, and received by, a receiving device, such as a terrestrial ("over-the-air") television receiver, a cable television receiver, a satellite television receiver, an Internet connected television or television receiver, a computer, a portable electronic device, or the like. In at least one embodiment, an audiovisual stream includes an audiovisual event. The audiovisual event may be a contiguous block of programming from a television channel (e.g., an episode of a television show) or other identifiable media content. For example, the audiovisual event may correspond to the programming on a single channel between 7:00 and 8:00, which may correspond with a single episode of a television program.

Further, an audiovisual stream may be delivered by any transmission method, such as broadcast, multicast, simulcast, closed circuit, pay-per-view, on-demand, over-the-top (by "streaming," file transfer, or other means), or other methods. Additionally, the audiovisual stream may be transmitted by way of any communication technology, such as by satellite, wire or optical cable, wireless, or other means. The audiovisual stream may also be transferred over any type of communication network, such as the Internet or other wide area network, a local area network, a private network, a mobile communication system, a terrestrial television network, a cable television network, and a satellite television network.

Along with the audiovisual event, programming information may be transmitted to the receiving device over the communication network. The programming information includes a list of audiovisual events (and corresponding television channels or other content sources) that are available for viewing during different time slots. The receiving device may display the programming information as an Electronic Program Guide (EPG). Typically, the EPG can be displayed on a presentation device. In some embodiments, the programming information also contains information about each available audiovisual event. This audiovisual event information, described in more detail below, may include information such as event name, series name, genre (theme) and subgenre (subtheme).

FIG. 1A illustrates an embodiment of a system 100-a for organizing programming information for audiovisual events that are available to be viewed. The system of FIG. 1A is operable for identifying audiovisual events relevant to a user, and organizing the programming information based on this relevance. The system 100-a includes a receiving device 102, a presentation device 104 (e.g., a display and speakers), a communication network 106, and a server 110. The receiving device 102 may also receive programming information through the communication network 106. The programming information may be provided by the server 110, or by another programming information resource.

Content sources (not shown) may provide audiovisual events to the communication network 106 and/or to other distribution networks, which in turn may transmit the audiovisual events to the receiving device 102. Alternatively, the receiving device may receive an audiovisual event directly from a content source. Examples of content sources may include a television channel from a broadcast station, a storage medium containing user-recorded content, automatically-recorded content, and/or purchased content, an on-demand media streaming service, a pay-per-view media streaming service, and/or an over-the-top media streaming service.

The receiving device 102 may access audiovisual events in various ways. For example, the receiving device 102 may access a television channel by demodulating and decrypting an audiovisual stream from the communication network 106. The receiving device 102 may access an over-the-top media streaming service by logging into a remote server (e.g., server 110) and downloading the audiovisual event over the communication network 106. The receiving device 102 may access a content source directly connected to the receiving device 102 using a local communication bus, such as parallel ATA (PATA, also called IDE or EIDE), Serial ATA (SATA), SCSI, Serial Attached SCSI (SAS), Fibre Channel, IEEE 1394 (also called FireWire), USB, SCSI, or Thunderbolt.

The communication network 106 may be any network capable of transmitting audiovisual events and/or programming information. Exemplary communications networks include over-the-air, satellite, and cable television networks, as well as wireless communication networks, public switched telephone networks (PSTN), local area networks (LAN), and wide area networks (WAN) providing data communication services and/or Internet access. The communication network 106 may utilize any desired combination of wired (e.g., cable and fiber) and/or wireless (e.g., cellular, satellite, microwave, and radio frequency) communication mediums and any desired network topology (or topologies when multiple mediums are utilized).

The receiving device 102 of FIG. 1 may be any device capable of receiving audiovisual events and programming information from the communication network 106. For example, in the case of the communication network 106 being a cable or satellite television network, the receiving device 102 may be a set-top box configured to communicate with the television network. The receiving device 102 may be a digital video recorder (DVR) in some embodiments. In another example, the receiving device 102 may be computer, a personal digital assistant (PDA), or similar device configured to communicate with the Internet or comparable communication network 106. The receiving device 102 may receive, capture, and record audiovisual events from non-broadcast media sources, such as video recorders, DVD players, personal computers or the Internet.

The presentation device 104 may be any device configured to receive an audio/video stream from the receiving device 102 and present the audio/video stream to a user.

Examples of the presentation device 102 include a television, a video monitor, or similar device capable of presenting audio and video information to a user. The receiving device 102 may be communicatively coupled to the presentation device 104 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the presentation device 104 may be integrated with the receiving device 102. For example, each of a computer, a PDA, and a mobile communication device may serve as both the receiving device 102 and the presentation device 104 by providing the capability of receiving audiovisual events from the communication network 106 and/or directly from a content source, and presenting the received audiovisual events to a user. In another implementation, a cable-ready television may include a converter device for receiving audiovisual events from the communication network 106 and/or directly from a content source, and displaying the audiovisual events to a user.

In the system 100, the receiving device 102 detects that a user is viewing an audiovisual event. The audiovisual event includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized.

Once the receiving device 102 detects that a user is viewing an audiovisual event, the receiving device 102 retrieves audiovisual event information associated with the audiovisual event. In some embodiments, the audiovisual event information may be embedded within the audiovisual event. In other embodiments, the audiovisual event information may be transmitted separately from the audiovisual event. For example, the receiving device 102 may receive programming information that provides audiovisual event information for events corresponding to specific dates, times, and content sources. The receiving device 102 may use the programming information to identify the audiovisual event information for the audiovisual event being viewed by the user based on the current time and content source.

The receiving device 102 may then store the audiovisual event information in a historical viewing database 115 on the remote server 110. The receiving device 102 may transmit the audiovisual event information to the remote server 110 over the communication network 106. Alternatively, in embodiments where the server 110 provides the audiovisual event information (e.g. by supplying the programming information or by transmitting the audiovisual event), the receiving device 102 may instruct the server 110 to store the corresponding audiovisual event information in the historical database 115.

The receiving device 102 may additionally store information associated with the receiving device 102 in the historical viewing database 115. The receiving device information may include a device identifier, a time at which the user began viewing the audiovisual event, and a time at which the user stopped viewing the audiovisual event.

The historical viewing database 115 may store information associated with many audiovisual events viewed by a user, and by other users. The audiovisual events may be viewed using multiple receiving devices 102. The server 110 may analyze the information in the historical database 115 to determine viewing preferences of a user. Based on the information in the historical viewing database 115, the server 110 may generate scoring tables 120. The scoring tables 120 indicate the user's viewing preferences. In some embodiments, the server 110 may generate the scoring tables 120 by updating or replacing previously generated scoring tables based on information stored in the historical viewing database 115 more recently. The scoring tables 120 may then be transmitted to the receiving device 102 and stored in a local storage unit.

The receiving device 102 may use the scoring tables 120 to organize programming information based on the user's viewing preferences. The programming information may be organized in various ways, as further described herein. The receiving device 102 may display the organized programming information to the user using the presentation device 104. For example, the receiving device 102 may organize an EPG to display television programs the user prefers to view at a particular time and date.

Figure 1B:
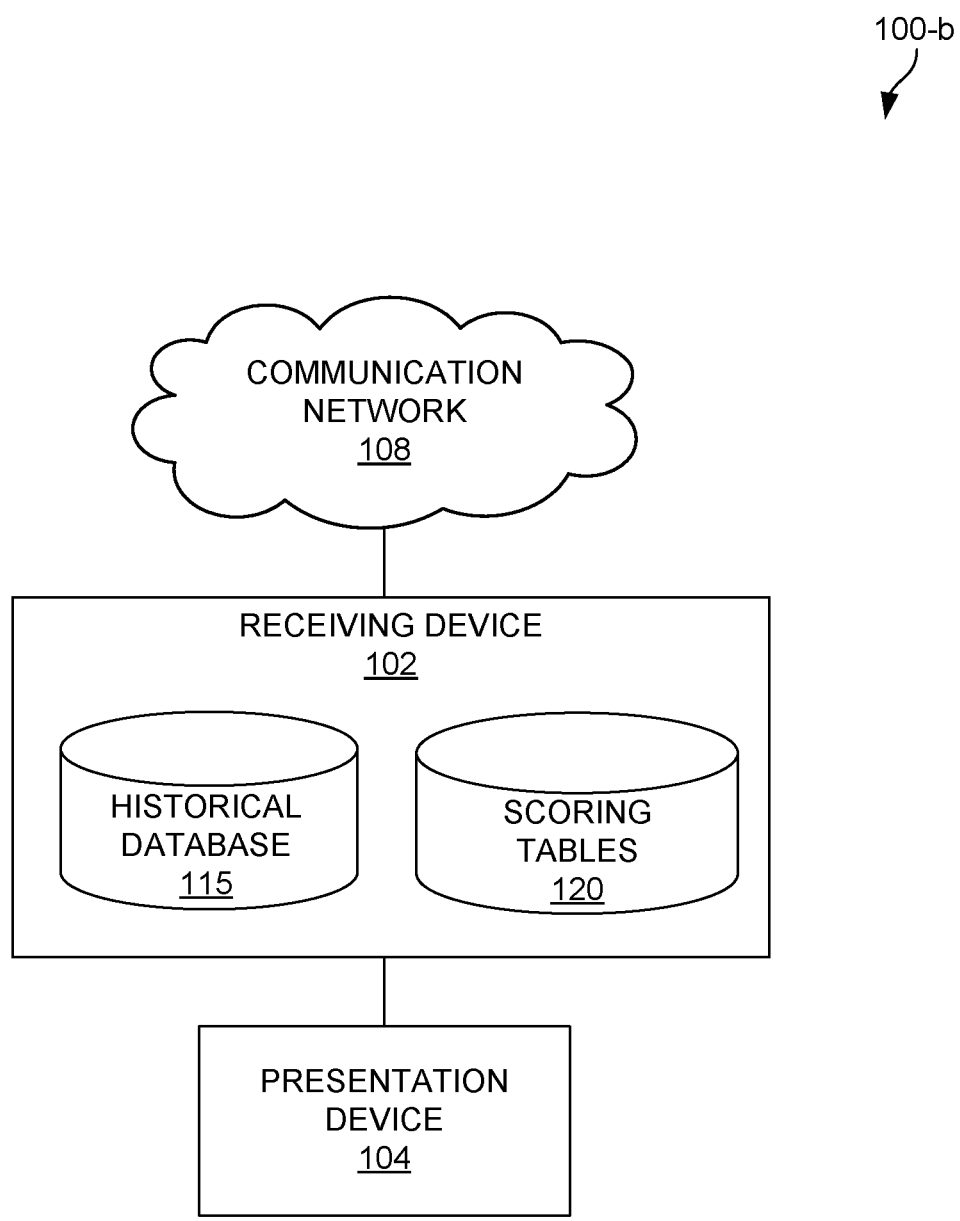
FIG. 1B illustrates another embodiment of a system for organizing programming information for audiovisual events that are available to be viewed.

FIG. 1B illustrates another embodiment of a system 100-b for organizing programming information for audiovisual events that are available to be viewed. The system 100-b includes a receiving device 102, a presentation device 104 (e.g., a display and speakers), and a communication network 106. The receiving device 102 may also receive programming information through the communication network 106. The system of FIG. 1B is operable similar to the system 100-a described in reference to FIG. 1A. However, in the system 100-b, the receiving device 102 stores information associated with viewed audiovisual events in a local historical viewing database 115. The receiving device 102 may then generate scoring tables 120 based on the information in the historical viewing database 115, and store the scoring tables 120 in a local storage unit. In some embodiments, the receiving device 102 may generate the scoring tables 120 by updating or replacing previously generated scoring tables based on information stored in the historical viewing database 115 more recently.

Figure 2:
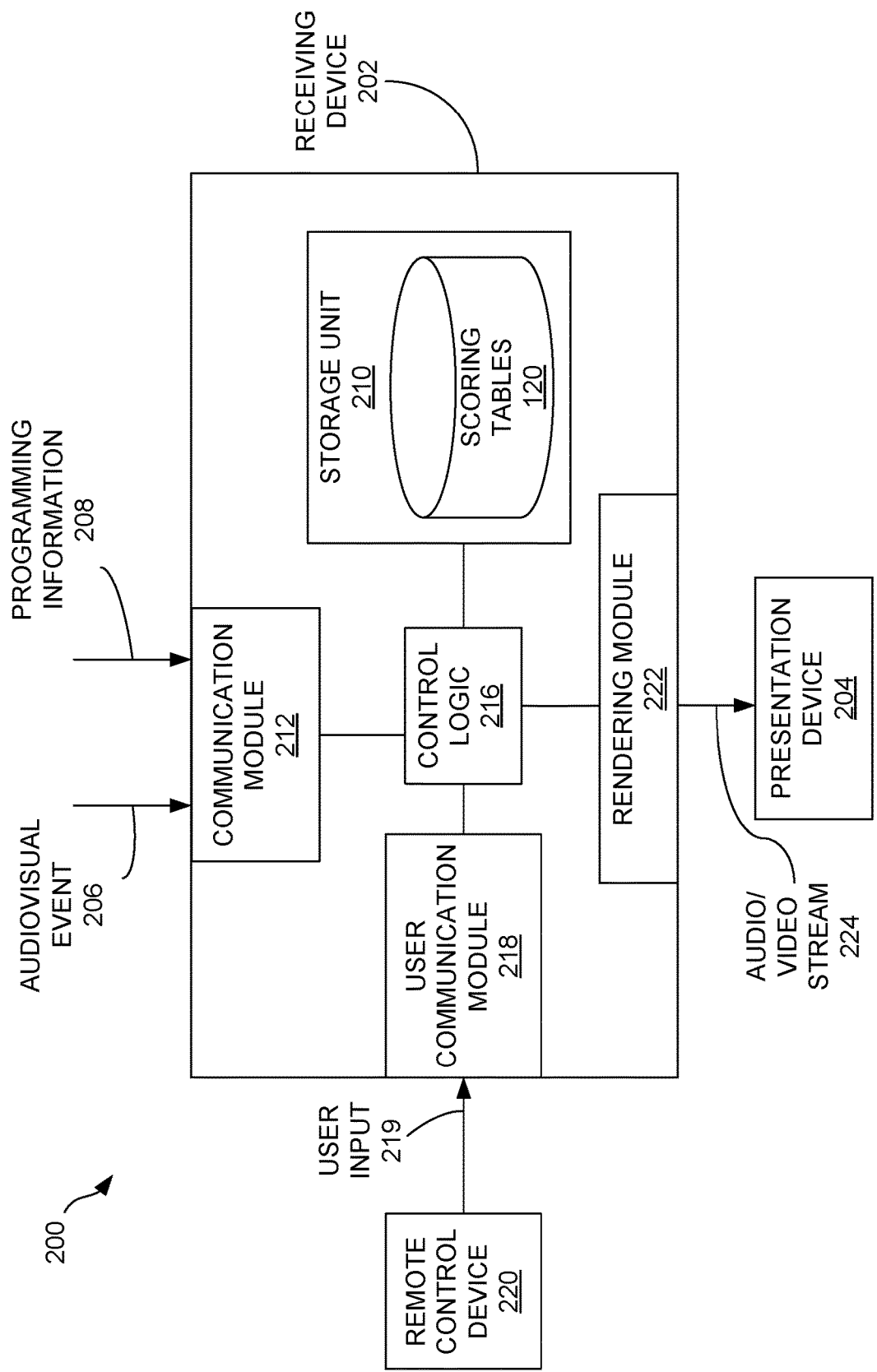
FIG. 2 illustrates an embodiment of a receiving device in a system for organizing programming information.

FIG. 2 illustrates an embodiment of a receiving device 202 in a system 200 for organizing programming information. The receiving device 202 may be an example of the receiving device 102 described in reference to FIGS. 1A and 1B. The receiving device 202 includes a communication module 212. The communication module 212 receives audiovisual events 206 from the communication network 106. The communication module 212 may also receive programming information 208 from the communication network 106.

One or more storage units 210 may be included internal and/or external to the receiving device 202. The storage unit 210 may store recorded audiovisual events and may act as a content source for the receiving device 202. The storage unit 210 may also store scoring tables 120. In some embodiments, the scoring tables 120 may be received by the communication module 212 over the communication network 106. In other embodiments, the storage unit 210 may store a historical viewing database, and the receiving device 202 may generate the scoring tables 120 from the information in the historical viewing database. In some embodiments, the receiving device 202 may generate the scoring tables 120 by updating or replacing previously generated scoring tables based on information stored in the historical viewing database 115 more recently.

The receiving device 202 may also include a user communication module 218, control logic 216, and a rendering module 222. The user communication module 218 receives user input 219 from a remote control device 220. The user communication module 218 may also transmit signals to the remote control device 220. The control logic 216 is operable to control the reception of audiovisual events from the communication module 212 and from the storage unit 210. The control logic 216 may also coordinate the storage of an audiovisual event to the storage unit 210. The control logic 216 may coordinate the output of an audiovisual event to the rendering module 222. The rendering module 222 renders the audiovisual event and outputs an audio/video stream 224 to a presentation device 204. Furthermore, the receiving device 202 and system 200 may include other components, modules, elements, or devices not illustrated for the sake of brevity.

The communication module 212 may receive an audiovisual event 206 from any type of content source. For example, the communication module 212 may be capable of receiving high definition television content, standard definition television content, 3-D television content, media content from the Internet (i.e., an over-the-top media stream), media content from network storage device attached to a LAN or WLAN (e.g., network attached storage), or other types of media content transmitted over a communication network.

In at least one embodiment, the user communication module 218 may receive a user input 219. For example, the user input may command the receiving device 202 to render an audiovisual event 206 corresponding to a particular broadcast channel. The control logic 216 may then instruct the communication module 212 to tune to the particular broadcast channel carrying the audiovisual event 206. The audiovisual event 206 may include audiovisual event information identifying the event (e.g. television program) and additional information about the audiovisual event, as further described herein. Alternatively or in addition, audiovisual event information may be obtained from the programming information 208 received separately from the audiovisual content 206. For example, the receiving device 202 may obtain the audiovisual event information from the programming information 208 based on the time, date, and television channel the receiving device 202 is tuned to.

The control logic 216, in combination with the user communication module 218, may detect a viewing action of audiovisual event 206 by detecting a keypress by the user on the remote control device 220. Once the control logic 216 detects that the audiovisual event 206 is being viewed by the user, the control logic 216 stores audiovisual event information corresponding to the viewed audiovisual event 206 in the historical viewing database 115. The historical viewing database 115 may be included in the storage unit 210 or in a remote server. The control logic 216 may also store receiving device information in the historical viewing database, and associate the receiving device information with the audiovisual event information.

In some embodiments, the control logic 216 may generate scoring tables 120 from the historical viewing database 115. In other embodiments, the scoring tables 120 may be generated remotely, and received by the communication module 212. In some embodiments, the scoring tables 120 may be generated by updating or replacing previously generated scoring tables based on information stored in the historical viewing database 115 more recently.

The control logic 216 may then organize the programming information 208 based on the scoring tables 120. The rendering module 222 may output the organized programming information to the presentation device 204 for viewing by the user.

Figure 3:
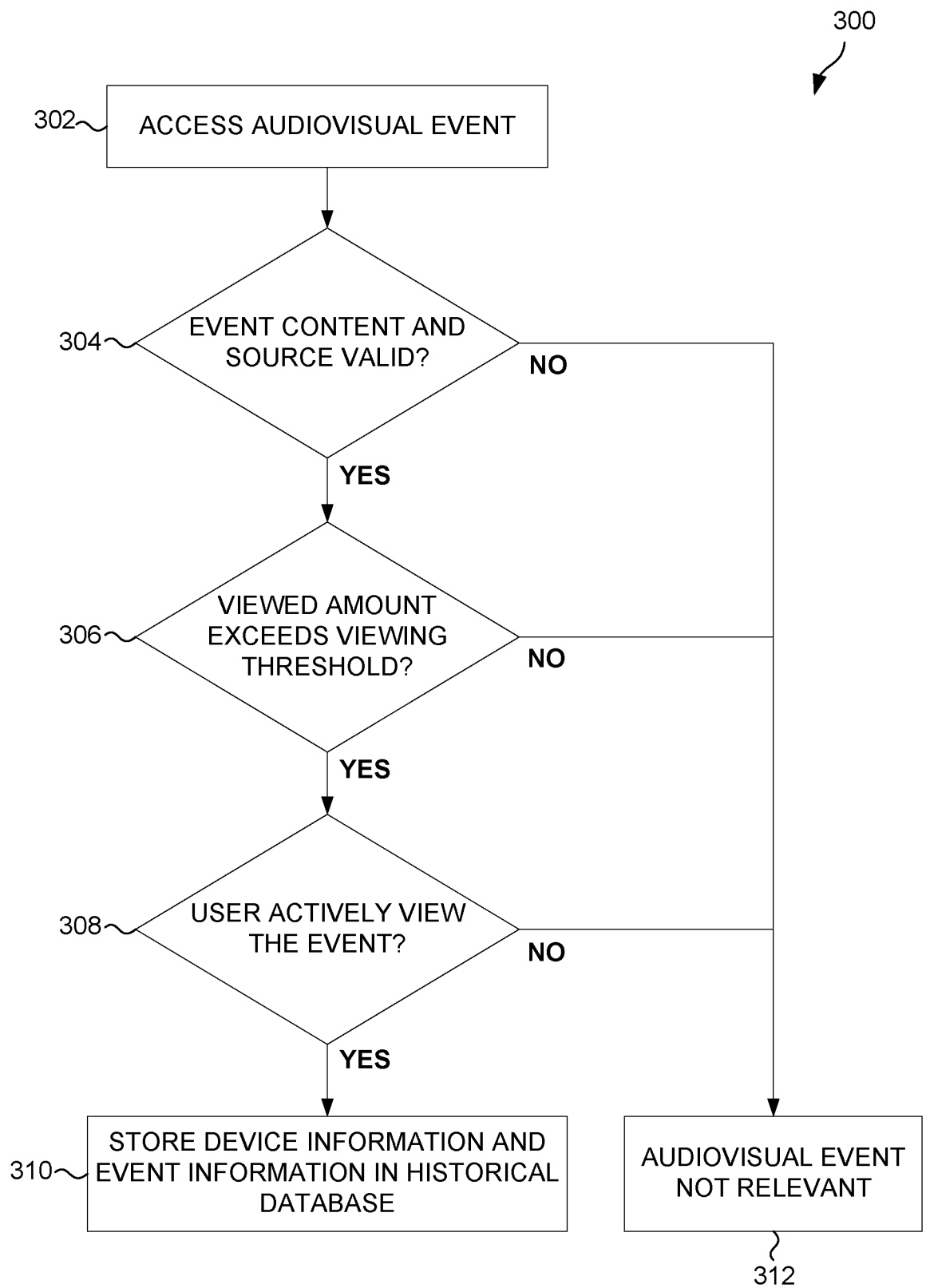
FIG. 3 illustrates an embodiment of a process for identifying whether to store an audiovisual event in the historical viewing database.

FIG. 3 illustrates an embodiment of a process 300 for identifying whether to store an audiovisual event in the historical viewing database 115. The operations of FIG. 3 are discussed in reference to the systems and receiving devices described in FIGS. 1A, 1B, and 2. The operations of the process 300 of FIG. 3 are not all-inclusive, and may comprise additional operations described herein, and/or other operations not illustrated for the sake of brevity.

In one implementation, the process 300 includes accessing an audiovisual event by a receiving device (operation 302). The audiovisual event may be accessed through a communication network or from a storage medium. The audiovisual event may include a television program, user-recorded content, automatically-recorded content, purchased content, on-demand media content, a pay-per-view media content, over-the-top media content, or other types of media content. In some examples, the audiovisual event may be accessed by tuning to a television channel from a broadcast station.

Once the audiovisual event has been accessed, the process 300 identifies whether the content of the audiovisual event and/or the source of the content are valid for storage in the historical viewing database (operation 304). For example, the process 300 may identify the source of the audiovisual event is a television channel that is excluded from storage in the historical viewing database (e.g., an adult channel, a barker channel, a program guide channel, etc.). Similarly, the process 300 may identify the content of the audiovisual event is excluded from storage in the historical viewing database (e.g., adult content). If the content of the audiovisual event and/or the source of the content are not valid, then the process 300 identifies the audiovisual event as not relevant and does not store the event in the historical viewing database (operation 312).

If the content of the audiovisual event and the source of the content are valid, then the process 300 determines the amount of the audiovisual event the user has viewed. The process 300 may determine the amount viewed by subtracting an end-viewing time from a begin-viewing time, and comparing the difference to the total duration of the audiovisual event. For example, if the receiving device tuned to a first audiovisual event at 4:15, then tuned to a second audiovisual event at 4:45, the viewed amount of the first audiovisual event would be 30 minutes. If the total duration of the first audiovisual event is 60 minutes, then the user viewed 50% of the first audiovisual event. The process 300 then identifies whether the viewed amount exceeds a viewing threshold (operation 306). The viewing threshold may be a constant or may be variable depending on the category of audiovisual event. For example, the threshold may be higher for movie events and lower for nightly news events. In addition, the threshold may be a viewing percentage (e.g. 25%) or a viewing time (e.g. 10 minutes).

In some embodiments, the viewing threshold may be variable. For example, a sporting event may have an initial viewing threshold of 30 minutes. As the sporting event progresses, the viewing threshold may change. For example, if the teams in the sporting event are close in score, then the viewing threshold may decrease to 10 minutes. Other changes in importance or nature of the audiovisual event may also affect the viewing threshold.

If the viewed amount does not exceed the viewing threshold, then the process 300 identifies the audiovisual event as not relevant and does not store the event in the historical viewing database (operation 312).

If the viewed amount does exceed the viewing threshold, then the process 300 identifies whether the user is actively viewing the audiovisual event (operation 308). The process 300 identifies the audiovisual event as being actively viewed if the receiving device receives a command from the user during the audiovisual event, or within a threshold duration before or after the audiovisual event (e.g., within 25 minutes). The command from the user may include a keypress on a remote control, such as a menu keypress or a channel keypress. If no command is received, then the process may assume the user is not actively viewing the audiovisual event (e.g., the presentation device may be powered off while the receiving device continues to render the audiovisual event). In this case, the process 300 identifies the audiovisual event as not relevant and does not store the event in the historical viewing database (operation 312).

If a command is received during the audiovisual event, or within the threshold duration before or after the audiovisual event, then the process 300 assumes the user has been actively viewing the audiovisual event. The process 300 then stores device information and event information associated with the audiovisual event in the historical viewing database (operation 310).

Figure 4:
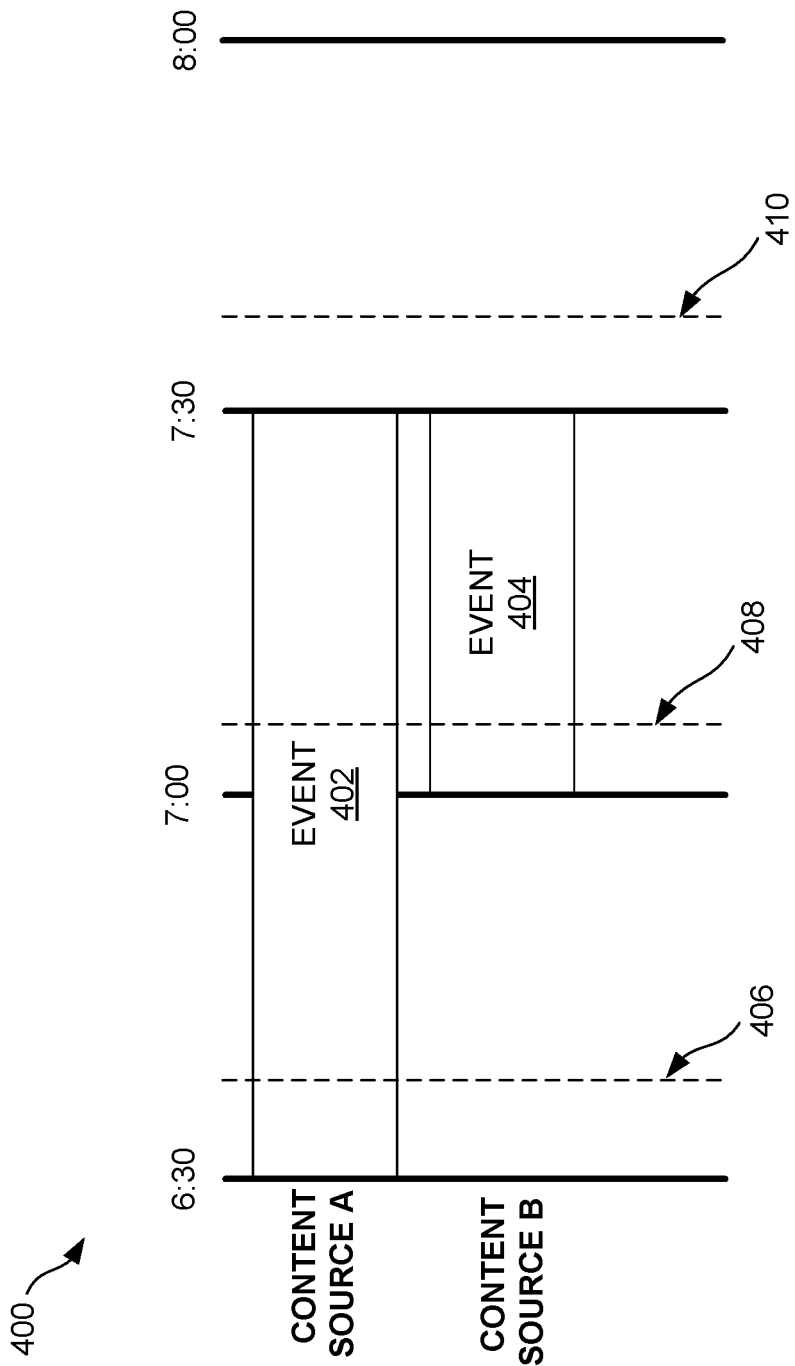
FIG. 4 illustrates an embodiment of a time schedule for audiovisual events which may be received by a receiving device.

FIG. 4 illustrates an embodiment of a time schedule 400 for audiovisual events which may be received by the receiving devices 102, 202 of FIGS. 1A, 1B, and 2. As illustrated in time schedule 400, an event 402 from "content source A" has a starting time of 6:30 and an ending time of 7:30. A second event 404 from "content source B" has a starting time of 7:00 and an ending time of 7:30. A user may command the receiving device to tune to "content source A" at 6:35 (406). The user may then command the receiving device to tune to "content source B" at 7:05 (408). Thus, the receiving device may determine that the user viewed event 402 for 30 minutes. The 30 minute viewing duration is 50% of the event duration. In one example, the receiving device may have a 25% viewing threshold for storing an audiovisual event in the historical viewing database. Since the user actively viewed 50% of event 402 and a command was recently received from the user, the device information and event information associated with the event 402 may be saved to the historical viewing database.

The user may continue viewing event 404 until it ends at 7:30. At 7:40 (410), the receiving device may detect that the user pressed a key on the remote (e.g., the "menu" key). Based on this keypress, the receiving device may determine that the user actively viewed the event 404. Thus, the user viewed 25 minutes of event 404. The 25 minute viewing duration is 83% of the event duration. Since the user actively viewed 83% of event 402 and a command was recently received from the user, the device information and event information associated with the event 404 may also be saved to the historical viewing database.

FIG. 5 illustrates an example of viewing information 500 stored to a historical viewing database 115, described in reference to FIGS. 1-4. The viewing information 500 is associated with an audiovisual event that qualifies for storage in the historical viewing database. The viewing information 500 includes receiving device information 502 and audiovisual event information 504. The receiving device information 502 may include a device identification 506 and/or one or more universal time codes (UTC) corresponding to a user action 510. In some embodiments, the receiving device information 502 may also include a user identification 508. Additional information about the receiving device may also be included in the receiving device information 502.

The audiovisual event information 504 may include a source identification 512, an event name 514, an event UTC 516, an event duration 518, a series identification 520, an episode identification 522, an original airdate (OAD) 524, one or more themes of the event 526, one or more actors in the event 528, one or more people associated with the event 530, one or more teams associated with the event 532, and/or one or more keywords associated with the event 534. Additional information about the event may also be included in the audiovisual event information 504.

Figure 6A:
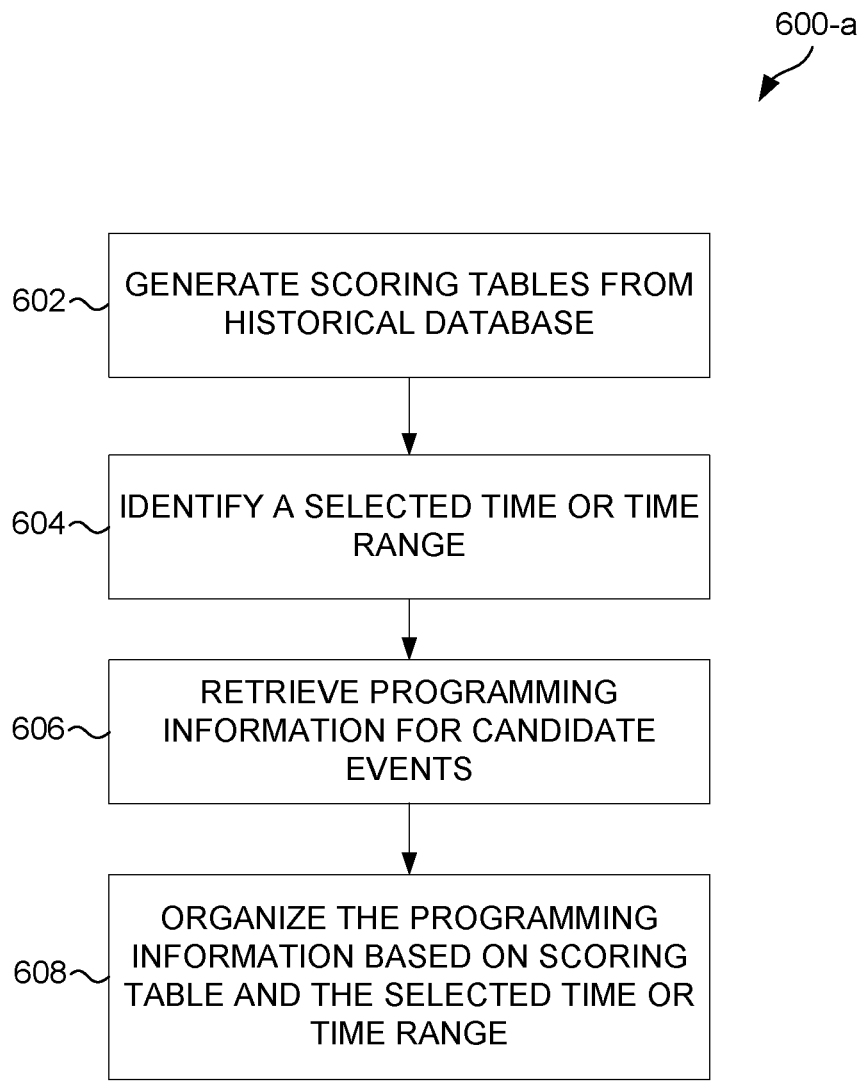
FIG. 6A illustrates an embodiment of a process for organizing programming information.

FIG. 6A illustrates an embodiment of a process 600-*a* for organizing programming information. The operations of FIG. 6A are discussed in reference to the systems and receiving devices described in reference to FIGS. 1-5. The operations of the process 600-*a* of FIG. 6A are not all-inclusive, and may comprise additional operations described herein, and/or other operations not illustrated for the sake of brevity.

In one implementation, the process 600-*a* includes generating scoring tables from the viewing information in the historical viewing database (operation 602). The process 600-*a* then identifies a selected time or time range (operation 604). If the user does not select a time or time range, then the selected time may correspond to the current time and date. In some embodiments, the process 600-*a* may also identify a current user. The current user may be identified based on a list of viewer habits and events currently watched by the user. For example, a first user may consistently watch a particular television program at a particular time of day. If the current user tuned the receiving device to that particular television program, then the receiving device may identify the current user as the first user.

The process 600-*a* also retrieves programming information for candidate events that are available to be viewed at the current time and date (operation 606). The process 600-*a* then uses the scoring tables to organize the programming information based on the viewing preferences for the selected time or time range (operation 608). In some embodiments, the programming information may be further organized based on the viewing preferences of the current user.

Figure 6B:
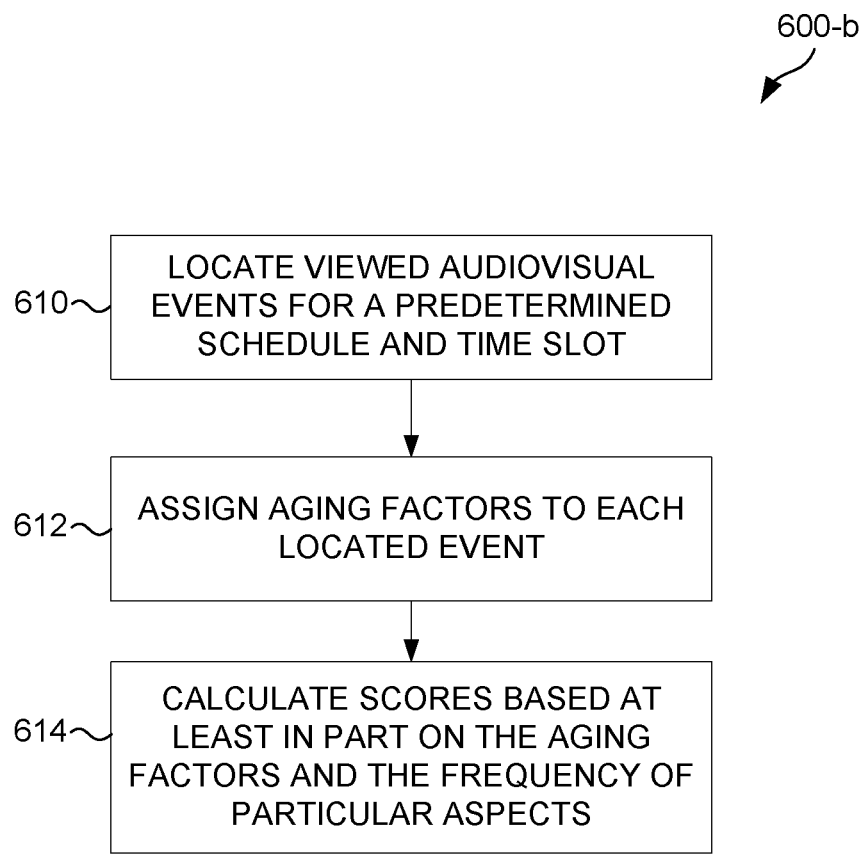
FIG. 6B illustrates an embodiment of a process for calculating scores for a scoring table.

FIG. 6B illustrates an embodiment of a process 600-*b* for calculating scores for a scoring table. The operations of FIG. 6B are discussed in reference to the systems and receiving devices described in reference to FIGS. 1-5. The operations of the process 600-*b* of FIG. 6B are not all-inclusive, and may comprise additional operations described herein, and/or other operations not illustrated for the sake of brevity.

In one implementation, the process 600-*b* includes locating viewed audiovisual events within the historical viewing database (operation 610) that fall within a predetermined schedule (i.e., one-time, daily, weekly, etc.) and time slot (i.e., 12:00-5:00, 5:00-8:00, etc.). The process 600-*b* then assigns aging factors to each event located within the predetermined schedule and time slot (operation 612). The aging factors are based on how long ago each audiovisual event was viewed. Older audiovisual events in the historical viewing database are assigned smaller aging factors and newer audiovisual events in the historical viewing database are assigned larger aging factors. In this way, audiovisual events that a user has viewed more recently are given more weight in determining the user's viewing preferences.

The process 600-*b* may then calculate scores for particular aspects of the located events (operation 614). The aspects may include the television series corresponding to the located events, actors in the located events, people associated with the located events, teams in the located events, themes of the located events, content sources (e.g., television channels) providing the located events, and/or other aspects. Different aspects may be given different scores. The scores are based on how frequently the particular aspect appears during the predetermined schedule and timeslot. For example, the process 600-*b* may have located all audiovisual events that were viewed on Wednesdays between 8:00 and 11:00. The process 600-*b* may calculate a score for the actor "Tom Hanks" by determining how frequently "Tom Hanks" was a featured actor in the located events. The score for "Tom Hanks" may be further influenced by the aging factor for each located event featuring Tom Hanks, and/or other weighting factors. The scores generally indicate a user's preference for viewing an audiovisual event having a particular aspect during a particular time window.

FIG. 7A illustrates an example of a "daily" series scoring table 700-*a*. The scoring table 700-*a* includes series identifications 702 for audiovisual events viewed any day of the week. The scoring table 700-*a* is divided into a plurality of time slots 704-710. While four time slots are shown, it should be understood that the scoring table 700-*a* may include any number of time slots. The information in the "daily" series scoring table 700-*a* may be based on the receiver device information 502 and audiovisual event information 504 stored in the historical viewing database 115 and described in reference to FIG. 5.

The series identifications 702 correspond to audiovisual events that have been viewed any day of the week, as recorded by the historical viewing database. While shown with five series identifications, it should be understood that the scoring table 700-*a* may include more or less series identifications based on how many audiovisual events have been viewed by a user. In addition, multiple or expanded "daily" series scoring tables 700-*a* may be generated for different receiver devices and/or users.

Each series identification 702 is given a score for each time slot 704-710. The scores may be based on how frequently audiovisual events having the series identification were viewed during each time slot. The scores may be further based on the aging factors for the audiovisual events. For example, the series "Adventure Time" may have been viewed 12 times during Time Slot C 708 within the last 90 days. The viewings of "Adventure Time" that were viewed more than 60 days ago may be assigned a low aging factor (e.g. 0.1). The viewings of "Adventure Time" that were viewed between 60 and 30 days ago may be assigned a higher aging factor (e.g. 0.5). And the viewings of "Adventure Time" that were viewed less than 30 days ago may be assigned the highest aging factor (e.g. 1.0). The score for "Adventure Time" at Time Slot C 708 may then be calculated based on the 12 viewings within the last 90 days, and the assigned aging factor for each viewing.

FIG. 7B illustrates an example of a "Monday" series scoring table 700-*b*. The scoring table 700-*b* includes series identifications 702 for audiovisual events viewed on Mondays. The "Monday" series scoring table 700-*b* is an example of a "weekly" scoring table. "Weekly" scoring tables may be generated for each day of the week, and may score aspects of audiovisual events that are watched on a weekly basis. The scoring table 700-*b* is divided into a plurality of time slots 704-710. While four time slots are shown, it should be understood that the scoring table 700-*b* may include any number of time slots. The information in the "Monday" series scoring table 700-*b* may be based on the receiver device information 502 and audiovisual event information 504 stored in the historical viewing database 115 and described in reference to FIG. 5.

The series identifications 702 correspond to audiovisual events that have been viewed on Mondays, as recorded by the historical viewing database. While shown with three series identifications, it should be understood that the scoring table 700-b may include more or less series identifications based on how many audiovisual events have been viewed by a user on Mondays. In addition, multiple or expanded "Monday" series scoring tables 700-b may be generated for different receiver devices and/or users.

Each series identification 702 is given a score for each time slot 704-710. The scores may be based on how frequently audiovisual events having the series identification were viewed during each time slot on Mondays. The scores may be further based on the aging factors for the audiovisual events. For example, the series "The Big Bang Theory" may have been viewed during Time Slot D 710 for 11 out of the last 12 Mondays. The viewings of "The Big Bang Theory" that were viewed more than 8 weeks ago may be assigned a low aging factor (e.g. 0.1). The viewings of "The Big Bang Theory" that were viewed between 8 and 4 weeks ago may be assigned a higher aging factor (e.g. 0.5). And the viewings of "The Big Bang Theory" that were viewed within the last 4 weeks may be assigned the highest aging factor (e.g. 1.0). The score for "The Big Bang Theory" at Time Slot D 710 may then be calculated based on the 11 viewings out of the last 12 Mondays, and the assigned aging factor for each viewing.

FIG. 8A illustrates an example of a "daily" actors scoring table 800-a. The scoring table 800-a includes actor identifications 802 for audiovisual events viewed any day of the week. The scoring table 800-a is divided into a plurality of time slots 804-810. While four time slots are shown, it should be understood that the scoring table 800-a may include any number of time slots. The information in the "daily" actors scoring table 800-a may be based on the receiver device information 502 and audiovisual event information 504 stored in the historical viewing database 115 and described in reference to FIG. 5.

The actor identifications 802 correspond to the actors featured in audiovisual events that were viewed any day of the week, as recorded by the historical viewing database. While shown with five actor identifications, it should be understood that the scoring table 800-a may include more or less actor identifications based on how many audiovisual events have been viewed by a user, and how many actors were featured in each event. In addition, multiple or expanded "daily" actor scoring tables 800-a may be generated for different receiver devices and/or users.

Each actor identification 802 is given a score for each time slot 804-810. The scores may be based on how frequently audiovisual events having particular actor identifications were viewed during each time slot. The scores may be further based on the aging factors for the audiovisual events. For example, the actor "Michael J. Fox" may have been featured in four audiovisual events during Time Slot D 810 within the last 90 days. The viewings of the audiovisual events featuring "Michael J. Fox" that occurred more than 60 days ago may be assigned a low aging factor (e.g. 0.1). The viewings of the audiovisual events featuring "Michael J. Fox" that occurred between 60 and 30 days ago may be assigned a higher aging factor (e.g. 0.5). And the viewings of the audiovisual events featuring "Michael J. Fox" that occurred less than 30 days ago may be assigned the highest aging factor (e.g. 1.0). The score for "Michael J. Fox" at Time Slot D 810 may then be calculated based on the four viewings within the last 90 days, and the assigned aging factor for each viewed audiovisual event.

FIG. 8B illustrates an example of a "Friday" actors scoring table 800-b. The scoring table 800-b includes actor identifications 802 for audiovisual events viewed on Fridays. The "Friday" actors scoring table 800-b is an example of a "weekly" scoring table. "Weekly" scoring tables may be generated for each day of the week, and may score aspects of audiovisual events that are watched on a weekly basis. The scoring table 800-b is divided into a plurality of time slots 804-810. While four time slots are shown, it should be understood that the scoring table 800-b may include any number of time slots. The information in the "Friday" actors scoring table 800-b may be based on the receiver device information 502 and audiovisual event information 504 stored in the historical viewing database 115 and described in reference to FIG. 5.

The actor identifications 802 correspond to actors featured in audiovisual events that were viewed on Fridays, as recorded by the historical viewing database. While shown with four actor identifications, it should be understood that the scoring table 800-b may include more or less series identifications based on how many audiovisual events have been viewed by a user on Fridays, and how many actors were featured in each viewed event. In addition, multiple or expanded "Friday" actor scoring tables 800-b may be generated for different receiver devices and/or users.

Each actor identification 802 is given a score for each time slot 804-810. The scores may be based on how frequently audiovisual events having particular actor identifications were viewed during each time slot on Fridays. The scores may be further based on the aging factors for the audiovisual events. For example, the actor "Harry Shearer" may have been featured in audiovisual events viewed during Time Slot C 808 on 11 out of the last 12 Fridays. The viewings of audiovisual events featuring "Harry Shearer" that occurred more than 8 weeks ago may be assigned a low aging factor (e.g. 0.1). The viewings of audiovisual events featuring "Harry Shearer" that occurred between 8 and 4 weeks ago may be assigned a higher aging factor (e.g. 0.5). And the viewings of audiovisual events featuring "Harry Shearer" that occurred within the last 4 weeks may be assigned the highest aging factor (e.g. 1.0). The score for "Harry Shearer" at Time Slot C 808 may then be calculated based on the 11 viewings out of the last 12 Fridays, and the assigned aging factor for each viewing.

The scoring tables 700-a, 700-b, 800-a, and 800-b described in reference to FIGS. 7A, 7B, 8A, and 8B are examples of possible scoring tables generated from the historical viewing database. Additional scoring tables for different schedules, time slots, and aspects of the viewed audiovisual events may also be generated. For example, in addition to the "daily" and "weekly" schedules, scoring tables may be generated for "one-time event" schedules, "mini-series" schedules, "seasonal" schedules, etc. Furthermore, scoring tables may be generated for additional aspects recorded in the historical viewing database. For example, in addition to series and actors, scoring tables may be generated for themes, people, teams, keywords, etc.

Figure 9:
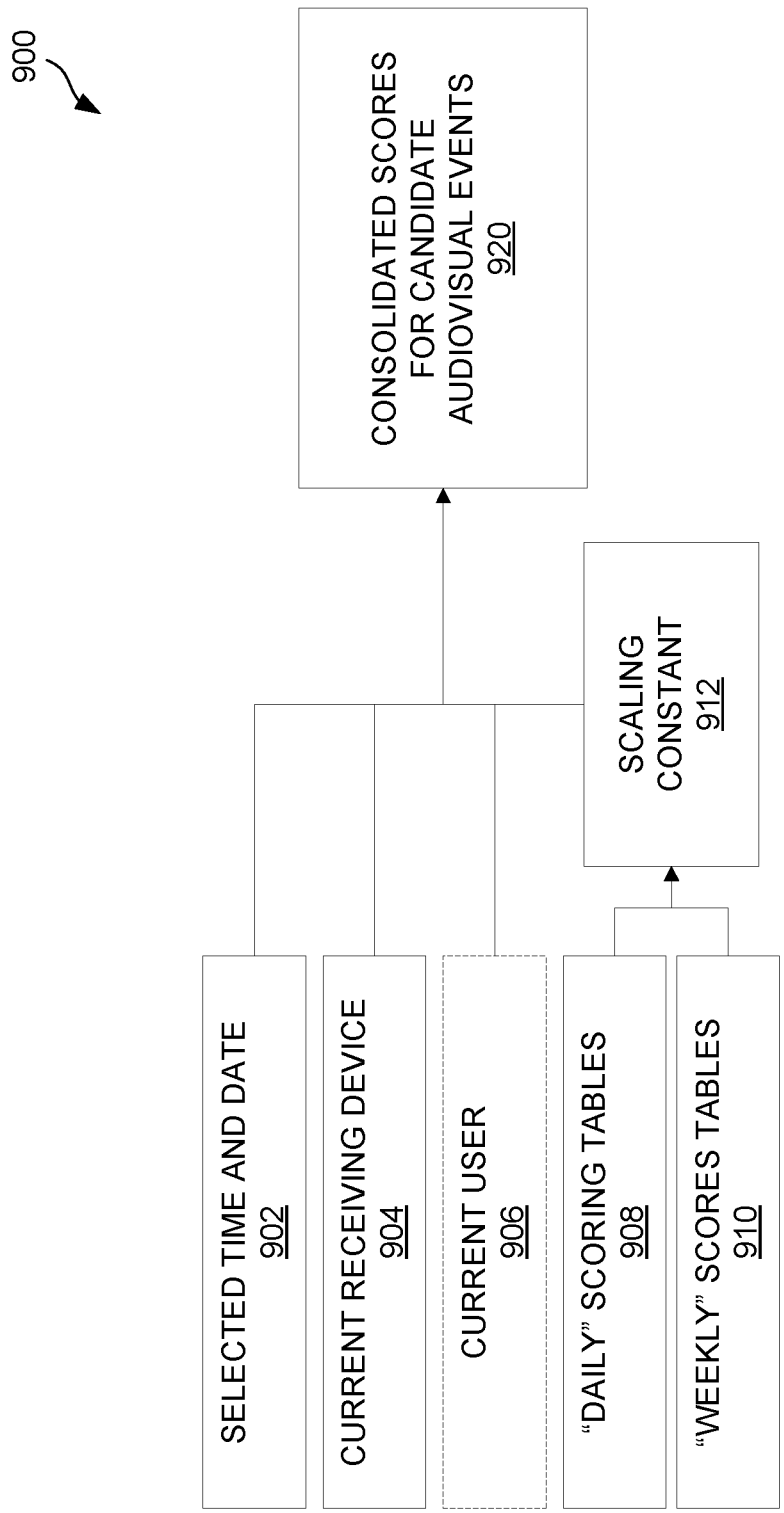
FIG. 9 illustrates a technique for determining the relevance of a candidate audiovisual event to a user.

FIG. 9 illustrates a technique 900 for determining the relevance of candidate audiovisual events to a user. The receiving device may receive programming information, which includes a list of candidate audiovisual events that are available to viewed at different times and from different content sources. The receiving device may evaluate each candidate audiovisual event based at least in part on one or more scoring tables 120. As shown in FIG. 9, the receiving device may identify a selected time and date 902, the current receiving device 904, the "daily" scoring tables 908, and the "weekly" scoring tables corresponding to the selected day. The selected time and date 902 may correspond to the current time and date, a time and date in the future, or time range. In some embodiments, the receiving device may also identify a current user 906.

Scaling constants 912 may be applied to each of the "daily" scoring tables 908 and the "weekly" scoring tables. Scaling constants 912 are fixed numeric values, defined by how the candidate audiovisual events are to be organized. The scaling constants 912 apply to the aspects (series, actors, themes, etc.) corresponding to the "daily" and "weekly" scoring tables 908, 910. The scoring tables for each aspect may have different scaling constants. For example, to organize the candidate audiovisual events by "Favorite Shows" that are available to be watched on Tuesday at 7:00, the technique 900 may identify the series in the "Tuesday" series scoring table with the highest scores for the 7:00 time slot. These scores may be multiplied by a scaling factor of 0.9. The technique 900 may also identify the series in the "daily" series scoring table with the highest scores for the 7:00 time slot. These scores may be multiplied by a scaling factor of 0.1. Similar scaling may be applied to the "daily" and "weekly" scoring tables for other aspects of the audiovisual events. Each of the scaled scores may be combined to generate consolidated scores for the current date and time 902 and current receiving device 904. These consolidated scores may then be mapped to the candidate audiovisual events, which are then organized by "Favorite Show".

Some candidate audiovisual events may not be mapped to the consolidated scores if they do not align with any aspects in the "daily" or "weekly" scoring tables 908, 910. In some examples, the receiving device may also identify a current user 906, and may then consider the current user 906 when generating the consolidated score 920.

Figure 10:
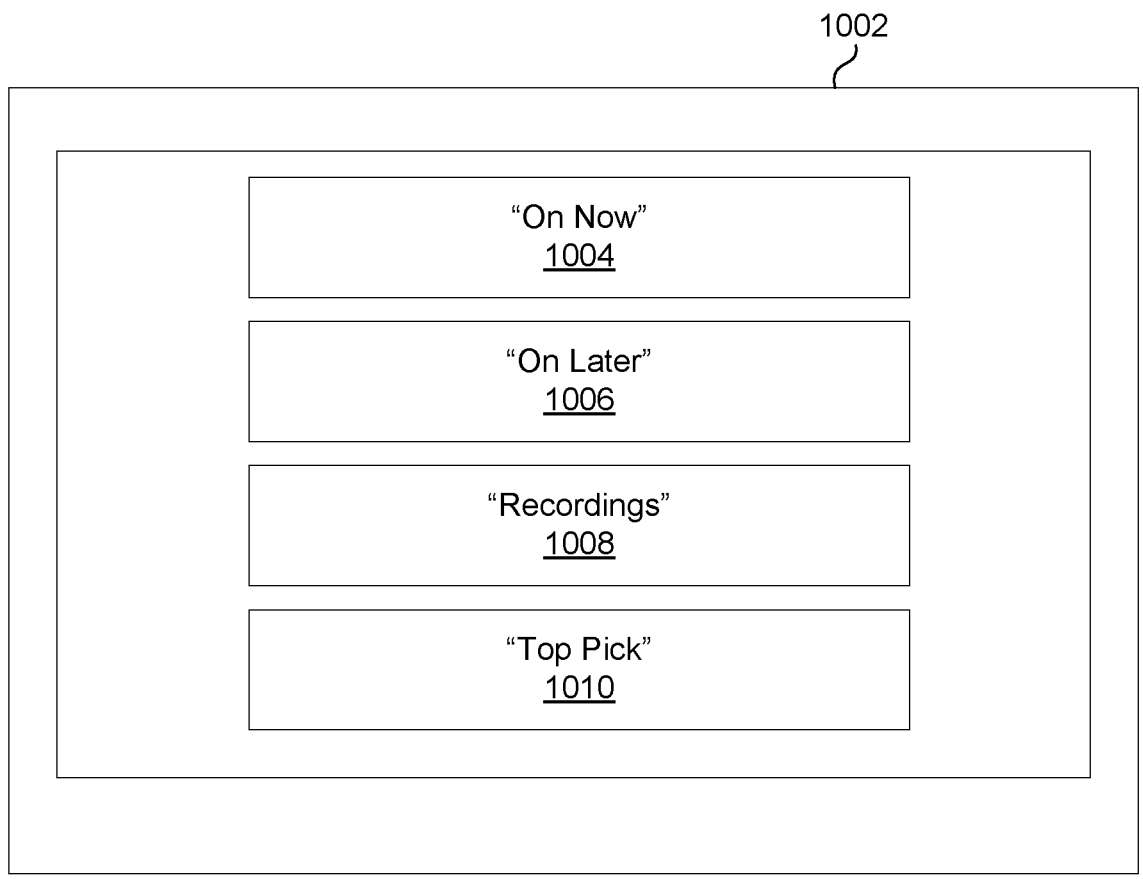
FIG. 10 illustrates an embodiment of a presentation device for presenting organized programming information to a user.

FIG. 10 illustrates an embodiment of a presentation device 1002 for presenting organized programming information to a user. The programming information includes a list of candidate audiovisual events that are available to be viewed at various times. A receiving device may organize the programming information into shelves. The shelves may include an "On Now" shelf 1004, an "On Later" shelf 1006, a "Recordings" shelf 1008, and a "Top Pick" shelf 1010. The programming information included in each shelf may be organized based on the consolidated scores described in reference to FIG. 9 and/or the scoring tables described in reference to FIGS. 7A-8B.

For example, the candidate audiovisual event presented first in the "On Now" shelf 1004 may correspond to the candidate audiovisual event having the highest consolidated score at the current date and time. Additional candidate audiovisual events having high consolidated scores for the current date and time may also be listed in the "On Now" shelf 1004. The candidate audiovisual events may be arranged from highest consolidated score to lowest consolidated score. If two or more candidate audiovisual events have the same consolidated score, the receiving device may identify whether one of the candidate audiovisual events is provided by a content source (e.g., television channel) that is viewed more frequently than another content source, and then organize that candidate audiovisual event higher in the "On Now" shelf 1004.

The candidate audiovisual event presented first in the "On Later" shelf 1006 may correspond to the candidate audiovisual event having the highest consolidated score at a future date and time. For example, the future date and time may be one hour ahead of the current date and time. Additional candidate audiovisual events available to be viewed at the future date and time may also be listed in the "On Later" shelf 1006. The candidate audiovisual events may be arranged from highest consolidated score to lowest consolidated score. If two or more candidate audiovisual events have the same consolidated score, the receiving device may identify whether one of the candidate audiovisual events is provided by a content source (e.g., television channel) that is viewed more frequently than another content source, and then organize that candidate audiovisual event higher in the "On Later" shelf 1006.

The candidate audiovisual events presented first in the "Recordings" shelf 1008 may correspond to recorded audiovisual events stored in the storage unit of the receiving device. The recorded audiovisual events may be organized in the "Recordings" shelf 1008 based on the consolidated score of each recorded audiovisual event. The recorded audiovisual events may be arranged from highest consolidated score to lowest consolidated score. If two or more recorded audiovisual events have the same consolidated score, the receiving device may identify whether one of the recorded audiovisual events is provided by a content source (e.g., television channel) that is viewed more frequently than another content source, and then organize that recorded audiovisual event higher in the "Recordings" shelf 1008.

The "Top Pick" shelf 1010 may combine the candidate and recorded audiovisual events from the "On Now" shelf 1004, the "On Later" shelf 1006, and the "Recordings" shelf 1008. The audiovisual events displayed in the "Top Pick" shelf 1010 may be organized by their consolidated scores, without regard to whether it is a recorded audiovisual event, an audiovisual event currently available to viewed, or an audiovisual event available to viewed in the future.

Figure 11:
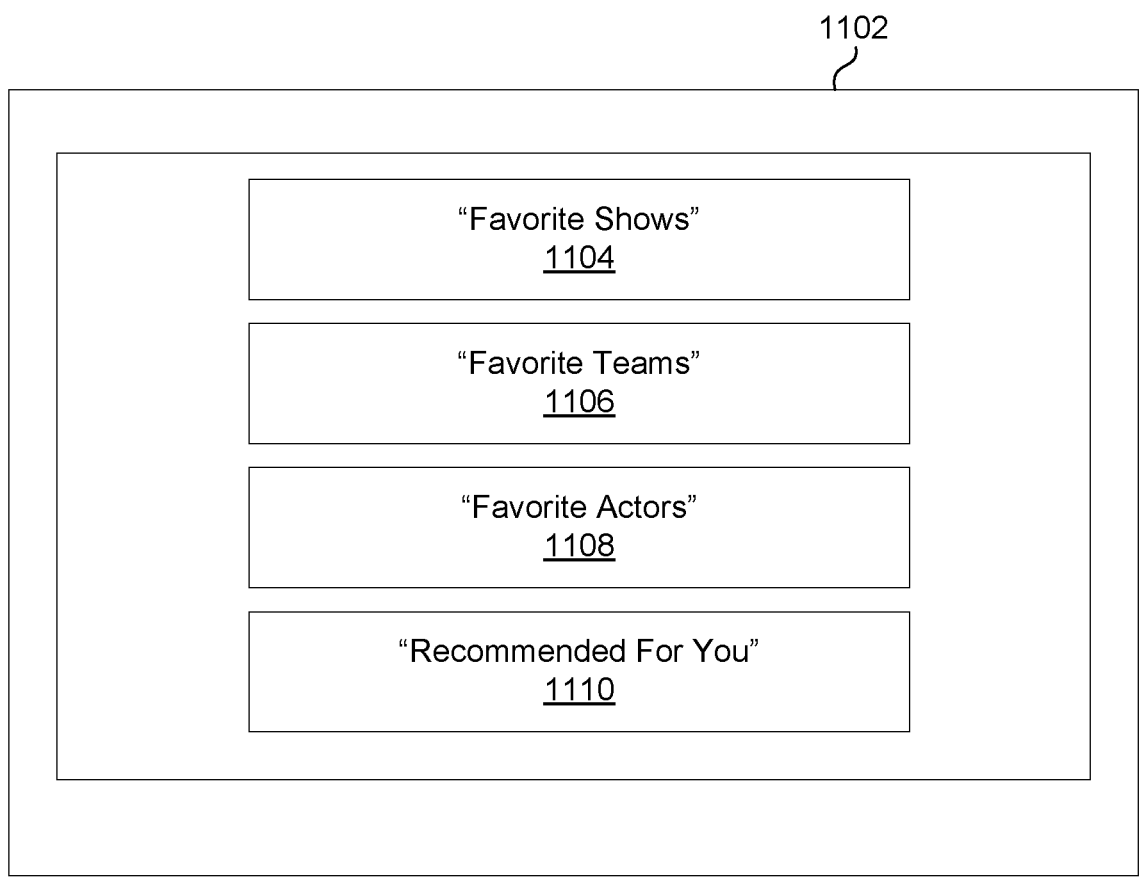
FIG. 11 illustrates an embodiment of a presentation device for presenting organized programming information to a user.

FIG. 11 illustrates an embodiment of a presentation device 1102 for presenting organized programming information to a user. The programming information includes a list of candidate audiovisual events that are available to be viewed at various times. A receiving device may organize the programming information into shelves. The shelves may include a "Favorite Shows" shelf 1104, a "Favorite Teams" shelf 1106, a "Favorite People" shelf 1108, and a "Recommended For You" shelf 1110. The programming information included in each shelf may be organized based on the one or more of the scoring tables and consolidated scores described in reference to FIGS. 7A-9.

For example, the candidate audiovisual events presented in the "Favorite Shows" shelf 1104 may be organized based on at least the "daily" and "weekly" series scoring tables described in reference to FIGS. 7A and 7B. The candidate audiovisual events may be arranged from highest consolidated series score to lowest consolidated series score. The candidate audiovisual events may be further organized based on the current time and date. For example, candidate audiovisual events having both a high consolidated series score and that are available to be viewed within the next 60 minutes may be presented first.

The candidate audiovisual events presented in the "Favorite Teams" shelf 1106 may be organized based on at least "daily" and "weekly" teams scoring tables. The candidate audiovisual events may be arranged from highest consolidated team score to lowest consolidated team score. The candidate audiovisual events may be further organized based on the current time and date. For example, candidate audiovisual events having both a high consolidated team score and that are available to be viewed within the next 60 minutes may be presented first.

The candidate audiovisual events presented in the "Favorite Actors" shelf 1108 may be organized based on at least the "daily" and "weekly" actors scoring tables described in reference to FIGS. 8A and 8B. The candidate audiovisual events may be arranged from highest consolidated actor score to lowest consolidated actor score. The candidate audiovisual events may be further organized based on the current time and date. For example, candidate audiovisual events having both a high actor score and that are available to be viewed within the next 60 minutes may be presented first.

The "Recommended For You" shelf 1110 may combine the candidate audiovisual events from the "Favorite Shows" shelf 1104, the "Favorite Teams" shelf 1106, and the "Favorite Actors" shelf 1108. The audiovisual events displayed in the "Recommended For You" shelf 1110 may be organized by overall highest consolidated scores from the scoring tables, without regard to whether it is a high consolidated series score, a high consolidated team score, or a high consolidated actor score.

Although specific embodiments were described herein, the scope of the invention is not limited to those specific embodiments. The scope of the invention is defined by the following claims and any equivalents therein.

What is claimed is:

1. A method for presenting relevant programming information, comprising:
   detecting a viewing action of an audiovisual event on a receiving device;
   retrieving data associated with the viewed audiovisual event;
   storing the retrieved data in a historical viewing database;
   generating at least one scoring table at a remote server;
   receiving the least one scoring table from the remote server, wherein the at least one scoring table is generated based on the historical viewing database;
   assigning a score to the audiovisual event;
   recording the score in the at least one scoring table;
   receiving programming information for a plurality of candidate audiovisual events that are available to be viewed;
   determining relevant candidate audiovisual events based on the score of the audiovisual event and the at least one scoring table; and
   outputting the relevant candidate audiovisual events as organized programming information for presentation by a presentation device.

2. The method of claim 1, wherein the programming information is organized based at least in part on a selected time or a selected time range.

3. The method of claim 1, wherein generating the at least one scoring table comprises:
   assigning an aging factor to the viewed audiovisual event based on a time since the audiovisual event was viewed.

4. The method of claim 1, wherein the at least one scoring table is generated based at least in part on the retrieved data in the historical viewing database, and wherein generating the at least one scoring table comprises at least one of:
   creating a new scoring table, updating an existing scoring table, or replacing an existing scoring table.

5. The method of claim 1, wherein the at least one scoring table is generated by the receiving device.

6. The method of claim 1, further comprising:
   identifying a user based at least in part on the retrieved data.

7. The method of claim 1, wherein the receiving device information comprises one or more of a receiving device identifier, a user identifier, a begin-viewing time, an end-viewing time, and a percentage-viewed.

8. The method of claim 1, wherein the audiovisual event information comprises one or more of an event identifier, a series identifier, an episode identifier, an event start time, an event duration, theme information, actor information, people information, team information, and keyword information.

9. The method of claim 1, wherein the at least one scoring table comprises one or more of a series scoring table, an actors scoring table, a teams scoring table, and a themes scoring table.

10. The method of claim 1, wherein the at least one scoring table includes a score and a time slot corresponding to at least one viewed audiovisual event.

11. The method of claim 1, wherein detecting the viewing action comprises:
    detecting a viewed amount of the audiovisual event exceeds a viewing threshold; and
    detecting the viewing action comprises detecting a user actively viewed the audiovisual event.

12. The method of claim 1, further comprising:
    calculating consolidated scores for the plurality of candidate audiovisual events, the consolidated scores based at least in part on the at least one scoring table and a scaling constant; and
    organizing the programming information based at least in part on the consolidated scores.

13. The method of claim 1, wherein outputting the organized programming information comprises:
    presenting a list of the plurality of candidate audiovisual events on a presentation device, wherein the list is organized based at least in part on the at least one scoring table.

14. The method of claim 1, wherein the plurality of candidate audiovisual events available to be viewed comprise at least one of broadcast television programs, video-on-demand programs, locally recorded audiovisual events, remotely recorded audiovisual events, or over-the-top audiovisual streams.

15. The method of claim 1, wherein the at least one scoring table is at least one of: a daily scoring table, a weekly scoring table, an actor scoring table, and a series scoring table.

16. A method for presenting relevant programming information, comprising:
    receiving a command to view an audiovisual event on a receiving device;
    retrieving data associated with the audiovisual event, the retrieved data comprising at least receiving device information and event information;
    generating at least one scoring table at a remote server;
    receiving the at least one scoring table from a remote server, wherein the at least one scoring table is generated based on a historical viewing database;
    identifying a user profile based at least in part on the retrieved data and the historical viewing database, the identifying further including retrieving a score of the audiovisual event, wherein the score of the audiovisual event is recorded in the at least one scoring table;
    receiving programming information for a plurality of candidate audiovisual events that are available to be viewed;

determining relevant candidate audiovisual events based on the user profile, the score of the audiovisual event, and the at least one scoring table; and outputting the relevant candidate audiovisual events as organized programming information for presentation by a presentation device.

17. The method of claim 16, wherein the programming information is organized based at least in part on a selected time or a selected time range.

18. A receiving device for presenting relevant programming information, comprising a processor, the processor comprising:

a user communication module to detect a viewing action of an audiovisual event on the receiving device;

a communication module to receive audiovisual event information associated with the viewed audiovisual event and programming information for a plurality of candidate audiovisual events that are available to be viewed;

a historical viewing database to store the audiovisual event information;

at least one scoring table generated from the historical viewing database, wherein the at least one scoring table is generated at a remoter server and received from the remoter server;

a control logic to assign a score to the audiovisual event and record the score in at least one scoring table; and a rendering module to output the plurality of candidate audiovisual events as organized programming information for presentation by a presentation device.

19. The receiving device of claim 18, wherein the programming information is organized based at least in part on a selected time or a selected time range.

20. The receiving device of claim 18, wherein the at least one scoring table is generated by:

assigning an aging factor to the viewed audiovisual event based on a time since the audiovisual event was viewed.

* * * * *